United States Patent [19]

Lazure et al.

[11] 4,244,123
[45] Jan. 13, 1981

[54] GUIDANCE DEVICE FOR DRAIN TILE LAYING MACHINE

[76] Inventors: Germain Lazure, 105 Beauregard Ave., Iberville (St-Jean), Quebec, Canada, J2X 2L9; Robert Gelesko, 1060, 38th Ave., Fabreville (Laval), Quebec, Canada, H7R 4W5

[21] Appl. No.: 24,020

[22] Filed: Mar. 26, 1979

[51] Int. Cl.$^3$ .......................... E02F 5/10; F16L 1/00
[52] U.S. Cl. .................. 37/193; 37/DIG. 1; 37/DIG. 20; 172/4.5; 404/84; 405/175; 405/181
[58] Field of Search .......... 37/193, 86, 80 R, DIG. 1, 37/DIG. 19, DIG. 20; 172/2, 4, 4.5; 356/152; 405/175, 181; 404/84

[56] References Cited

U.S. PATENT DOCUMENTS

| | | | |
|---|---|---|---|
| 3,046,681 | 7/1962 | Kutzler | 37/DIG. 20 |
| 3,778,168 | 12/1973 | Willner | 37/80 R X |
| 3,813,171 | 5/1974 | Teach et al. | 37/80 R X |
| 4,050,171 | 9/1977 | Teach | 37/86 |
| 4,120,364 | 10/1978 | Wooldridge | 172/4 X |
| 4,142,817 | 3/1979 | Lazure | 37/193 X |
| 4,162,708 | 7/1979 | Johnson | 37/DIG. 20 |

FOREIGN PATENT DOCUMENTS 2387322 11/1978 France .......................... 37/86

Primary Examiner—Clifford D. Crowder

[57] ABSTRACT

An improved guidance device for use with an earthworking machine, more especially a drain tile laying machine, comprising a earthworking element mounted about a pivot connection. This guidance device comprises a signal emitter and two signal receivers mounted on the earthworking element of the machine. The two signal receivers are mounted on the element in a longitudinal spaced apart relation, so as to distinguish between a depth change or an attitude change in the element. The guidance device also comprises operating means including an electronic control circuit and an hydraulic operating circuit for adjusting the attitude or depth of the element depending on the indication given by the signal receivers.

8 Claims, 7 Drawing Figures

GUIDANCE DEVICE FOR DRAIN TILE LAYING MACHINE

BACKGROUND OF THE INVENTION

The present invention relates to an improved guidance device for use with an earthworking machine, and more particularly with a trench digging machine.

Guidance devices for use with trench digging machines, and more particularly with drain tile laying machines, are already known.

To properly drain a field, it is necessary to lay the drain tile at a slight slope. It is therefore necessary to dig the trench in which the tile is to be laid, at a slight slope. This normally involves the use of guidance means which automatically directs the trench digging machine to dig the trench at the desired slope.

A known guidance device for automatically directing a trench digging machine, comprises a signal emitter, such as a laser gun, which is located in the field at a reference point higher than the highest point to be dug. The signal emitter emits from the reference point a signal beam, such as a laser beam at an angle matching the desired slope. A signal receiver which is located at the top of a telescopic mast mounted on the plow of the trench digging machine, receives the laser beam and actuates suitable operating means which adjust the depth of the trench digging element, or plow, of the machine. To allow for proper laying of the drain, the telescopic mast, the signal receiver and the plow on which they are mounted, are adjusted at given intervals with respect to the line defined by the signal beam, depending on the average inclination of the field to be drained, so that the drain may be laid substantially at constant depth with respect to the surface of the ground while following the desired slope.

When starting digging the trench, the plow is set at a desired depth and the mast is set so that its receiver receives the signal from the emitter in the middle of its receiving surface area. Then the plow begins to move relative to the emitter and to dig the trench along a programmed line. This programmed line is previously defined by a land surveyor to compensate the irregularities of the ground while substantially matching the desired slope at which the trench is to be dug.

To allow the plow to follow such a programmed line, the mast is adjustable in height and manually programmable so that the receiver may continue to receive the signal of the emitter whatever may be the inclination of the ground to be dug. If the surface of the ground is inclined upwardly with respect to the programmed line, the operator of the plow may manually program the mast so that it lowers at such a continuous speed that the receiver continues to receive the signal of the emitter in the middle of its receiving area while the plow continues to move a constant depth with respect to the upwardly inclined surface of the ground. If the surface of the ground is inclined downwardly with respect to the programmed line, the operator may also manually monitor the mast so that it raises at continuous speed, to hold the plow at constant depth with respect to the downwardly inclined surface of the ground. Such manual monitoring permits the plow to dig the trench at a constant depth while substantially following the desired slope.

If the plow begins to move away from its programmed line because of some irregularities in the field, the signal begins to be received by the receiver away from its receiving surface area. This signal shifting actuates the operating means of the plow which in turn move the plow until the emitted signal is again received in the middle of the receiving surface area. Thus the depth of the plow is permanently adjusted and/or corrected to obtain the proper slope.

Such a guidance system is usually satisfactory. However, problems are encountered when digging a trench either in a rocky or hard ground or in a soft ground. In striking a rocky or hard ground, the nose of the plow may be deflected and thus change its attitude without necessarily changing in depth or level.

In entering a soft ground, the whole plow may sink in the ground and thus change in depth, without necessarily changing in attitude. However, in both cases, the receiver located on the plow will move with the latter and incorrectly signal a depth change causing the trench to be incorrectly dug.

Actually, the already known guidance system cannot readily and automatically distinguish between a plow depth change and a plow attitude change.

SUMMARY OF THE INVENTION

An object of the present invention is to provide an improved guidance device which overcomes the above problem, that is, which can distinguish between a plow depth change and plow attitude change and adequately correct the position of the plow to dig a proper trench.

In accordance with the present invention this object is achieved with an improved guidance device which comprises a signal emitter and two signal receivers mounted on the earthworking element, or plow, which is mounted about a pivot connection. The two signal receivers are mounted on the plow in longitudinal spaced-apart relation, one on each longitudinal side of the pivot connection of the plow, so as to indicate a depth change or an attitude change in the plow. The guidance device also comprises operating means for adjusting the attitude or depth of the plow depending on the indication given by the signal receivers.

The improved drain tile laying machine according to the invention comprises a plow mounted about a pivot connection for digging a trench at a desired slope and laying a drain tile in the trench, a tractor for pulling the plow, means for controlling the attitude of the plow and means for controlling the depth of the plow. As aforesaid, the guidance device comprises a signal emitter located at a reference point in the field to be dug, and two signal receivers mounted on the plow in longitudinal spaced-apart relation, one on each longitudinal side of the pivot connection, so as to sense both the attitude and the level of the plow.

The guidance device also comprises operating means actuated by the signal receivers, which operating means adjust either the attitude control means or the depth control means or both of them so as to move the plow back to its desired attitude and depth if it deviates therefrom.

To allow for proper laying of the drain at a desired slope, the emitter is preferably located in the field at a reference point higher than the highest point to be dug, and adjusted to emit therefrom a signal beam at an angle matching the desired slope. The receivers are located at the tops of two telescopic masts which are both set so that both receivers receive the horizontal signal from the emitter in their middles. As the plow begins to move upwards or downwards in the field, the masts may be simultaneously lowered or raised in a continuous manner with respect to the line defined by the signal beam to compensate any irregularities, as is conventionally made when a single mast is used.

BRIEF DESCRIPTION OF THE DRAWINGS

The invention will be better understood with reference to the accompanying drawings in which.

DETAILED DESCRIPTION OF PREFERRED EMBODIMENTS

Figure 1:
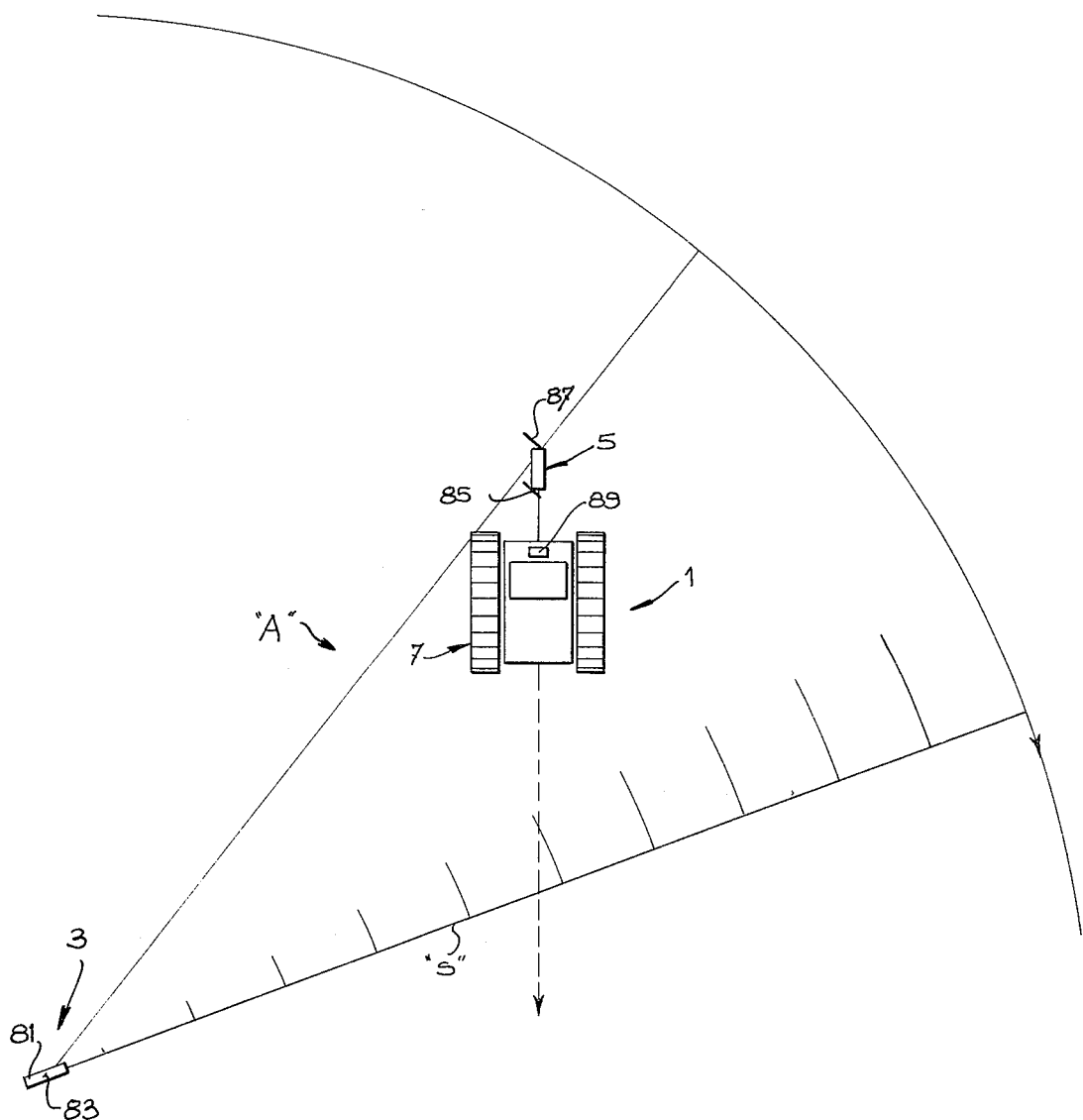
FIG. 1 is a top plan view of a drain tile laying system according to the invention.
Figure 2:
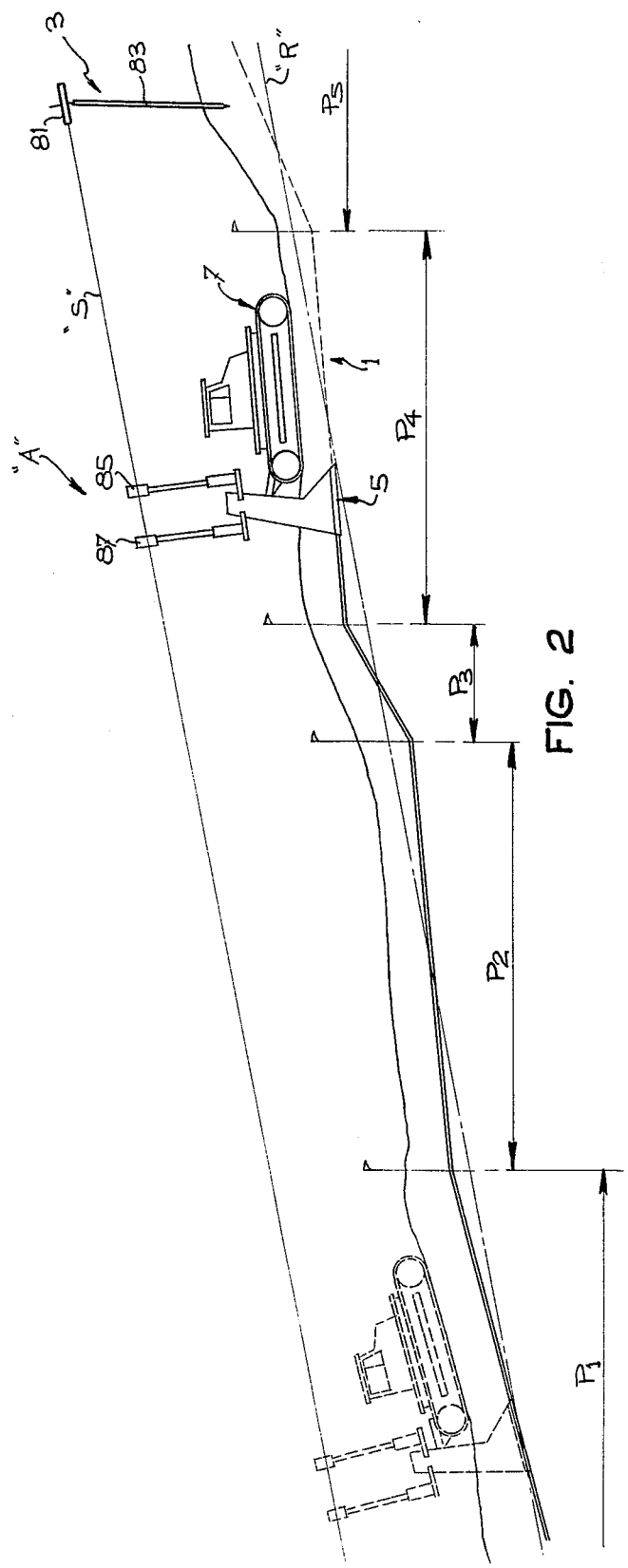
FIG. 2 is an elevational view of the drain tile laying system shown in FIG. 1.
Figure 3:
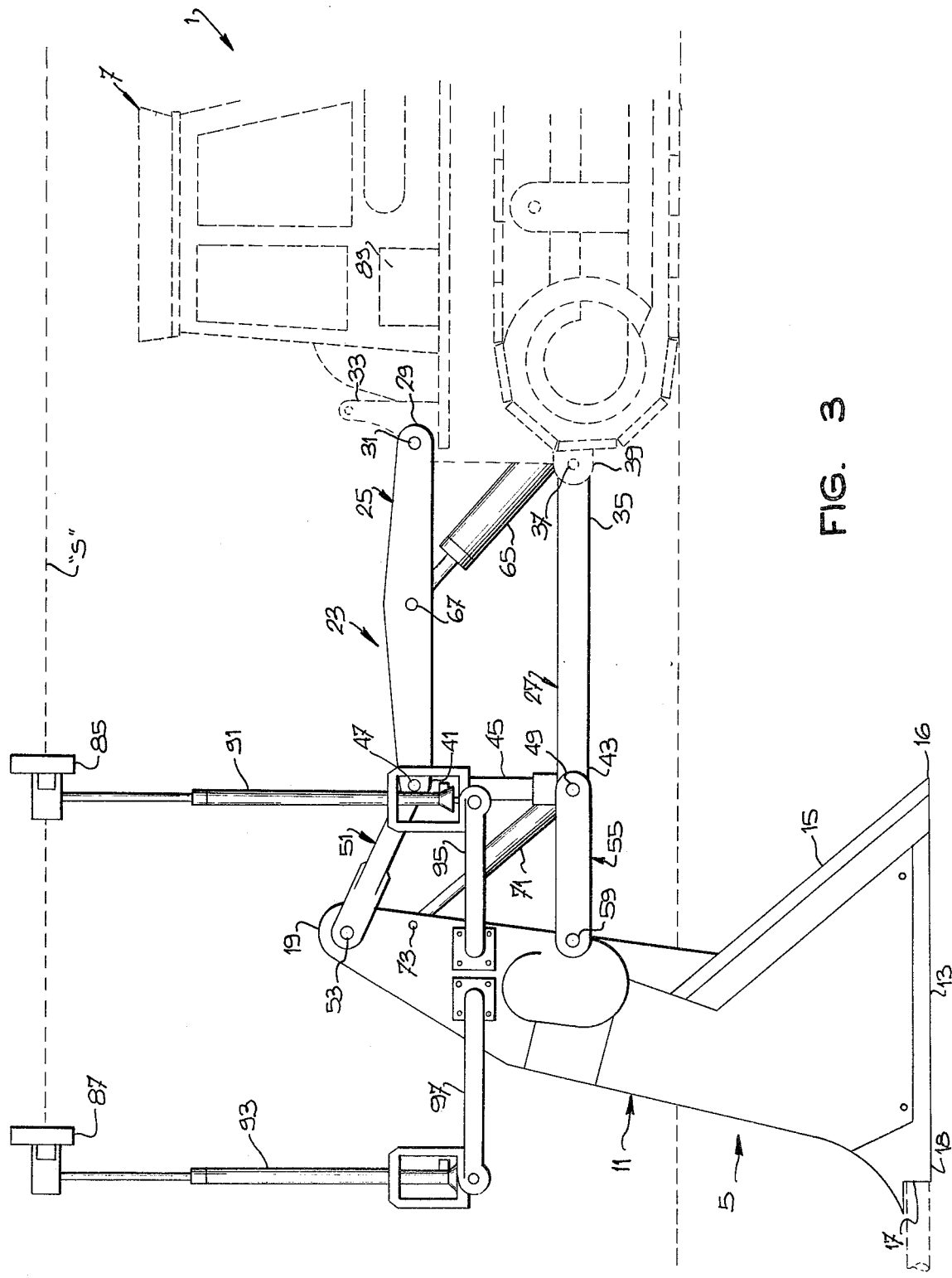
FIG. 3 is an elevational view of a drain tile laying machine according to the invention with guidance receivers mounted thereon and the plow at a desired attitude and depth.

The drain tile laying system "A" shown in FIGS. 1 and 2 comprises a drain tile laying machine 1 and a guidance system 3. The drain tile laying machine 1 as shown in detail in FIGS. 3 to 5 includes a plow 5 and a tractor 7 for pulling the plow.

The plow 5 is of the type used to dig a trench for a drain tile, to lay the tile in the trench, and to close the trench on the tile, all in one operation. The plow 5 has an upright main body 11 with a flat base or shoe 13 and a blade 15 extending up and back from the front or toe 16 of the base 13. An outlet 17 is provided at the rear or heel 18 of the base 13 from which the drain tile to be laid emerges. The tile is fed into the body 11 of the plow near its upper end 19, and passes down through the body 11 to emerge into the trench from the outlet 17.

The plow 5 is pulled by the tractor 7. The plow is connected to the tractor 7 by a parallelogram-type linkage system 23. The linkage system 23 includes a pair of upper and lower, generally parallel main links 25 and 27. The front end 29 of the upper main link 25 is pivotably connected by a pivot pin 31 to a bracket 33 on the upper rear end of tractor 7, and the front end 35 of the lower main link 27 is pivotably connected by a pivot pin 37 to a bracket 39 on the lower rear end of the tractor. The rear ends 41 and 43 of main links 25 and 27 are joined together by a cross link 45. The link 45 is pivotably connected at its ends to the ends 41 and 43 of the main links 25 and 27 by pins 47 and 49 respectively.

An upper, secondary, adjustable-length link 51 joins the end 41 of the upper main link 25 to the upper end 19 of the plow body 11. The upper secondary link 51 is pivotably connected at one end to the upper end 19 of the plow by a pin 53, and at its other end to the upper main link 25 by the pin 47. A lower, secondary link 55 connects the end 43 of the lower main link 27 to the plow body 11 at a location spaced below the upper end 19 but above the blade 15. The lower, secondary link 55 is pivotably connected at one end to the plow body 11 by a pin 59 and is pivotably connected at its other end to the lower main link 27 by the pin 49.

A first hydraulic cylinder 65 is provided to control the depth of the plow 5. The cylinder 65 is pivotably connected at one end to the bottom rear end of tractor 7 and at its other end, by a pin 67, to the upper main link 25, intermediate its ends 29 and 41. A second hydraulic cylinder 71 is provided to control the tilt or attitude of the plow 1. This second cylinder 71 is pivotably mounted at one end to the pin 49 on the linkage 27 and at its other end to the plow body by a pivot pin 73 at a location just below the upper end 19 and well above the pivot pin 59. The first cylinder 65 can be operated to raise or lower the plow, relative to the tractor, about the pins 31 and 37 so as to plow a trench to a desired depth below the ground surface. Second cylinder 71 can be operated to tilt the plow 5 about the pins 47 and 59 to change the attitude of the plow so that its base 13 remains generally parallel to the ground surface when the plow is raised or lowered.

The above described plow and linkage construction are already known and form the subject matter of United States patent application Serial No. 870,736 filed on January 19, 1978 now U.S. Patent No. 4,142,817. The hydraulic cylinders 65 and 71 are connected to an hydraulic system operated by the motor of the tractor. This hydraulic system is operated by suitable electronic means actuated either manually from the tractor, or automatically as part of the guidance device 3.

The guidance device 3 includes a signal emitter 81, positioned at the reference point 83, two signal receivers 85 and 87 on the plow 5 for receiving signals from the emitter 81, and operating means 89 actuated by the receivers for automatically operating the hydraulic cylinders 65 and 71 so as to maintain the plow 5 at a desired working depth and attitude. The signal emitter 81 comprises a rotating laser beam generator. The signal receivers 85 and 87 are mounted on the top ends of two vertical telescopic masts 91 and 93, respectively. The masts 91 and 93 are mounted onto the plow body 5 by two support arms 95 and 97, respectively, and both include suitable adjusting means (not shown) for increasing or reducing their heights and thus adjusting the receivers 85 and 87 so that they can be aligned with the signal from the emitter.

The receivers 85 and 87 are positioned to be longitudinally spaced apart from each other on the plow with one receiver 85 located on the one side of the plow pivot 59 and the other receiver located the other side of plow pivot 59.

The receivers 85 and 87 are operatively connected to the operating means 89 which automatically actuate the hydraulic cylinders 65 and 71 to control the depth and attitude of the plow depending on how the receivers 85 and 87 receive a signal from the signal emitter 81.

In operation, the signal emitter 81 is located at a reference point 83 which must be at a higher altitude than the highest point of the ground to be dug. To satisfy this particular requirement in every ground, the signal emitter 81 can be mounted on the top of a post or turret, as shown in FIG. 2.

The signal emitter 81 is adjusted so as to emit a rotating signal beam "S" at an angle matching the desired slope "R" which is previously determined by conventional land-survey.

In the meantime, the drain tile laying machine 1 is located at a starting point in the field and the cylinders 65 and 71 are manually operated to adjust the plow 5 at the desired depth, with its base 13 at the desired attitude. The telescopic masts 91 and 93 are manually set so that the signal "S" from the emitter 81, as it rotates about the reference point 83, impinges at the center of each receiver 85 and 87.

When all of these preliminary operations have been completed, the operating means 89 of the guidance device 3 are switched on and the drain tile laying machine 1 starts to move.

Figure 6:
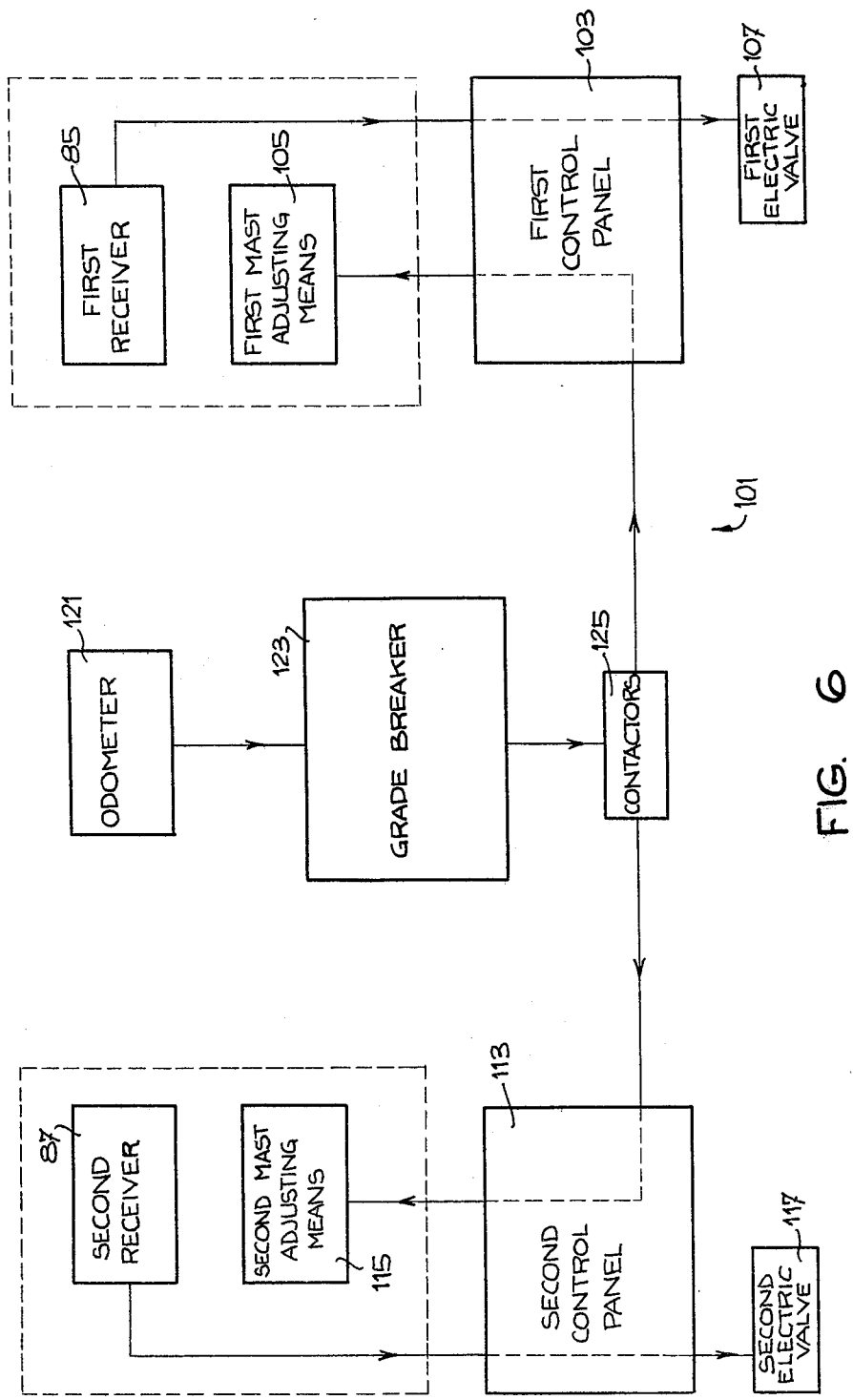
FIG. 6 is an electronic diagramm of the operating means of the machine shown in FIGS. 3 to 5.
Figure 7:
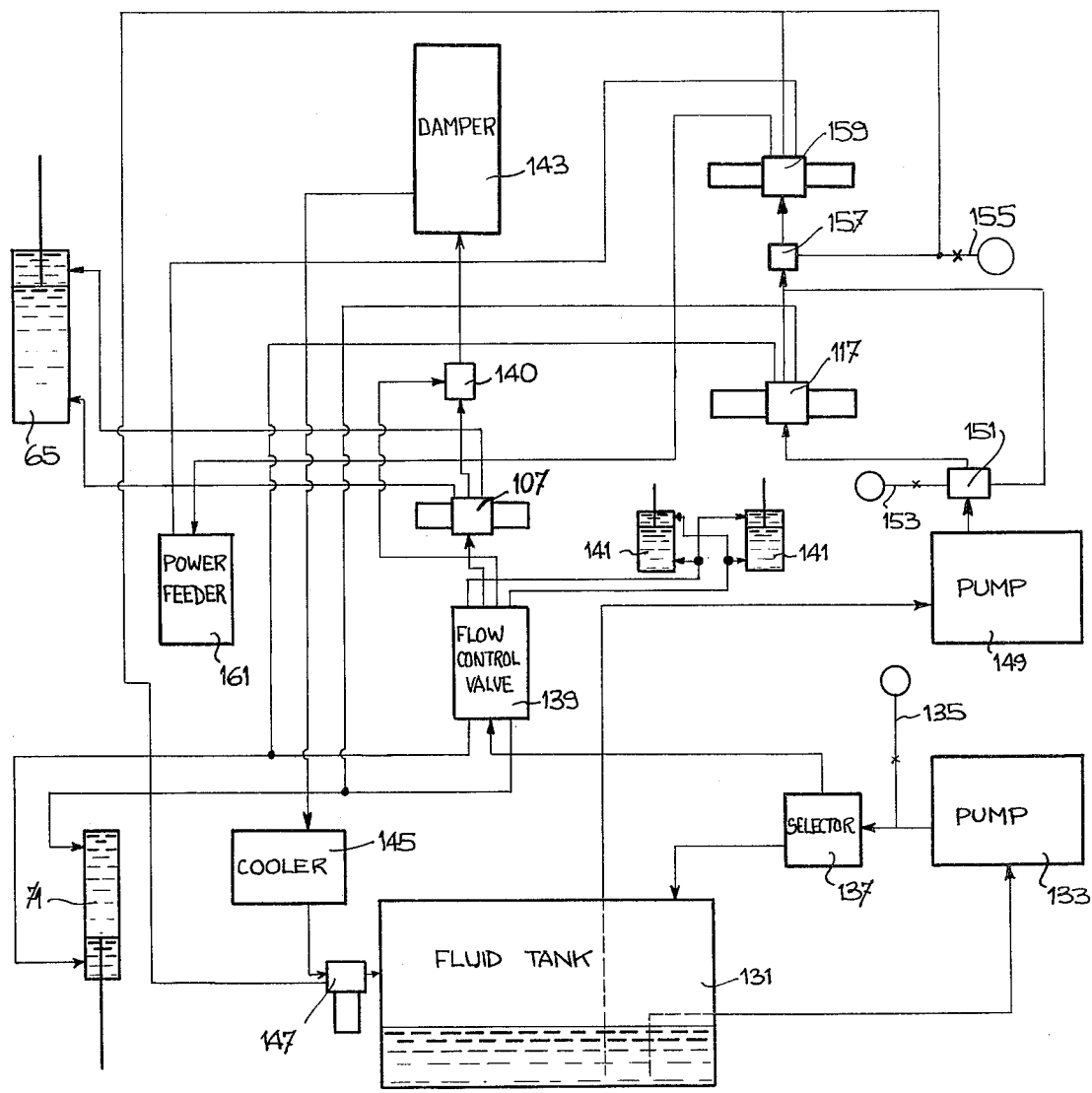
FIG. 7 is a hydraulic diagramm of the operating means of the machine shown in FIGS. 3 to 5.

Referring to FIGS. 6 and 7 of the drawings, the operating means 89 of the guidance device 3 comprises an electronic control circuit and an hydraulic operating circuit which is operated by the motor of the tractor.

The electronic control circuit 101 which is schematized on FIG. 6, comprises a first control panel 103 connected to the adjusting means 105 of the first mast 91, the first receiver 85 and a first electric valve 107 for operating the first hydraulic cylinder 65. The electronic circuit 101 also comprises a second control panel 113 identical to the first one, but connected to the adjusting means 115 of the second mast 93, the second receiver 87 and a second electric valve 117 for operating the second hydraulic cylinder 71. Both control panels 103 and 113 may be operated independently from each other to adjust the masts at the desired height and the plow at the desired depth and attitude before starting digging, or simultaneously either to correct the attitude and depth of the plow depending on the indication given by the signal receivers 85 and 87 or to raise or lower the masts 91 and 93 at constant speed to compensate the irregularities of the field. Thus, for example, if the plow has to dig the trench at a constant depth while passing along a surface portion $P_1$, $P_3$, $P_5$ of the field which is upwardly inclined with respect to the programmed slope "R", height of the masts must decrease as the plow moves forwards, so as to keep the plow at a constant depth with respect to the surface of the ground. Inversely, if the plow has to dig a trench along a surface portion $P_2$, $P_4$ . . . of the field which is downwardly inclined with respect to the programmed slope "R", the height of the masts must increase as the plow moves forwards so as to keep the plow at the same constant depth with respect to the surface of the ground.

The raising or lowering of the plow with respect to the line defined by the signal beam "S" as the plow moves forwards, is performed by using a programmable grade breaker 123 associated to a suitable electric odometer 121 and connected to both first and second mast adjusting means 105 and 115 via a set contactors 125 connected to the first and second control panels 103 and 113.

Every time there is some change in the slope of the field to be dug with respect to the desired and programmed lines "R" and "S", the operator of plow manually adjusts the grade breaker 123 in a suitable position "sub" or "add" corresponding to the desired grade or inclination that should follow the drain tile. Then the operator switches the grade breaker onto the odometer 121 which then automatically actuates the latter in a continuous manner or at regular distance intervals when the plow moves. The so automatically actuated grade breaker 123 acts simultaneously on the first and second control panels 103 and 113 via the contactors 125, which act in turn on the first and second masts adjusting means 105 and 115 to raise or lower simultaneously both masts 91 and 93 and therefore both receivers 85 and 87, a predetermined height.

The changes in the slope in the field to be dug with respect to the programmed line "R" may be marked in the field by means of flags or any other indicators suitably set up along the direction in which the plow will move, during the preliminary land-survey of the field.

Figure 4:
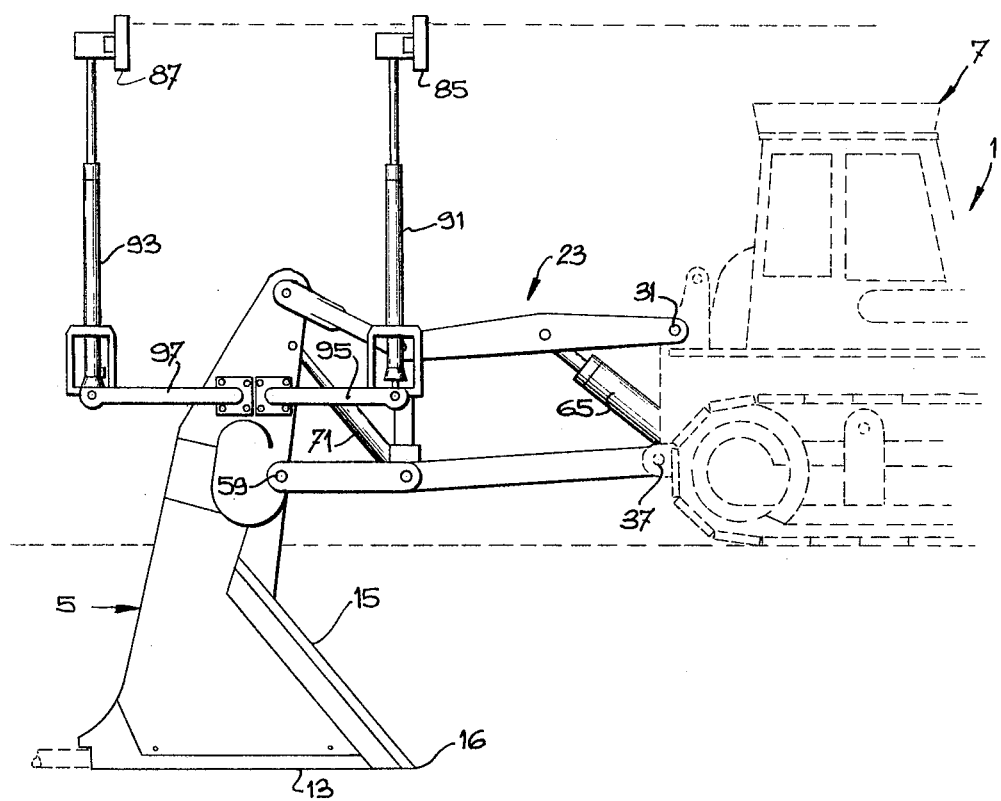
FIG. 4 is an elevational view of the machine showing the plow at a different depth from the desired depth.

As long as the signal "S" from the rotating emitter 81 impinges at the center of each receivers 85 and 87, the hydraulic cylinders 65 and 71 remain in their set positions. If now the plow does not follow the desired line "R" and for example, begins to work at a depth slightly below the said datum line, the signal "S" will impinge on both receivers 85 and 87 in their top portion, as shown in FIG. 4, as the emitter 81 rotates. This off-center signal impingement on the receivers 85 and 87, off-center in the same direction on both receivers, is transmitted to the first and second control panels 103 and 105 and therefrom to the first and second electric valves 107 and 117 respectively, which automatically operate the first and second cylinders 65 and 71 to raise the plow and simultaneously correct its attitude until the signal is centered again on both receivers.

As aforesaid, the second cylinder 71 must be operated at the same time as the first cylinder, to adjust the tilt of the plow at its new depth and to maintain it in its desired attitude. Indeed, as the plow is raised about the pivots 31 and 37, the nose 16 of the plow points down. Thus the cylinder 71 must be extended to pivot the plow counterclockwise about the pivot 59 to level the plow. Conversely if the signal "S" is received by both receivers 85 and 87 at a location below their center, indicating that the plow is working at a depth above the desired depth, the control panels 103 and 105 automatically actuate the first and second electric valves 107 and 117 respectively, which in turn operate the first cylinder 65 to lower the plow 5 about the pivots 31 and 37 and, at the same time, the second cylinder 71 to tilt the plow about the pivot 59 and to lower its nose 16 to keep it level.

Figure 5:
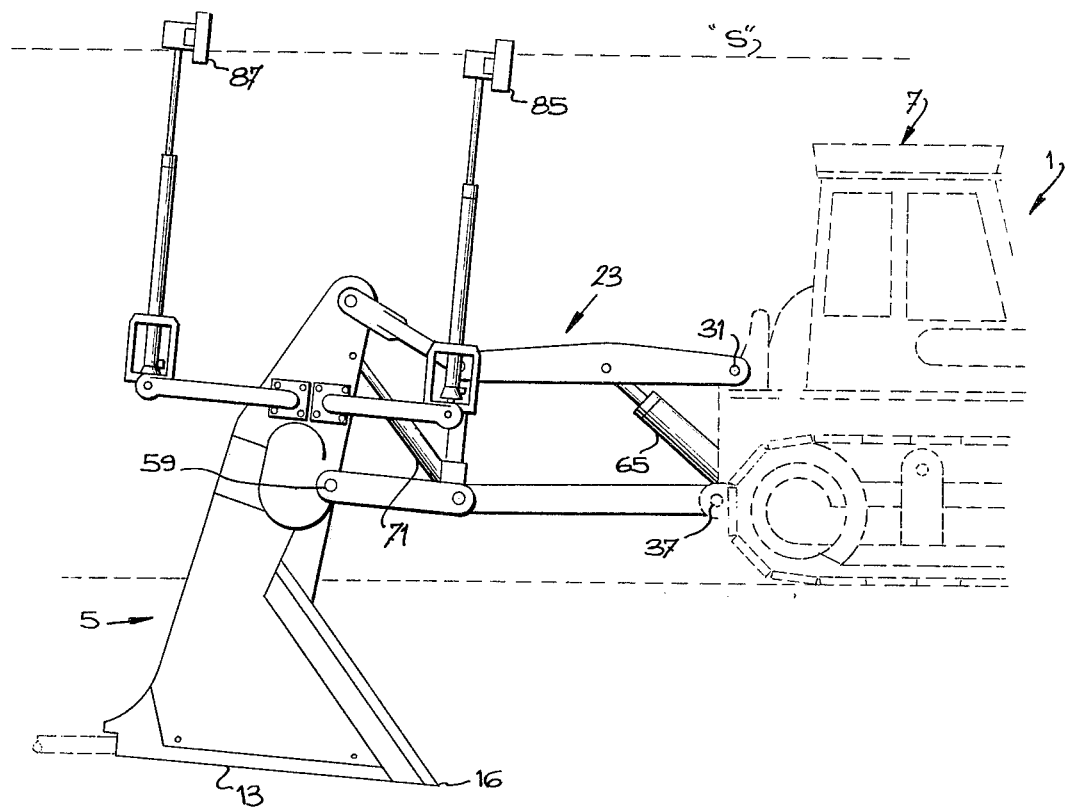
FIG. 5 is an elevational view of the machine showing the plow at a different attitude from the desired attitude.

If the plow 5 tilts about the pivot 59 while operating, such as, for example, when encountering hard ground, the signal "S" is sensed in opposed locations on the receivers 85 and 87, as shown in FIG. 5. Because the receivers are located on opposite sides of the pivot 59 about which the plow body tilts, the receiver 85 will receive the signal "S" in a top location which is opposite to the bottom location at which the other receiver 87 receives the signal. The first control panel 103 then will automatically actuate the first electric valve 107 and cylinder 65 to raise the plow while the second control panel 113 actuates the second electric valve 117 and cylinder 71 to tilt the plow body 11 about pivot 59 in the direction to level the plow.

From the above, one can see that the electronic control circuit of the plow can be operated either manually to adjust the masts before starting digging or every time there is a change in the average slope of the field, or semi-automatically to correct any change in depth or attitude of the plow.

One can also see that the electronic control circuit of the plow can be used either as monitoring means or as indicating means since it automatically detects any change in slope, attitude or depth for the plow.

It is obvious that, in every case, the simultaneous independent actuation of both cylinders 65 and 71 in one or the other direction will create an oscillating movement, since any movement of one or the other cylinder will move simultaneously both receivers which in turn will actuate one or both cylinder, and so on. However, because of the structure of the plow and the period of response of the hydraulic circuit to any impulsion, such an oscillating movement, will be of a very small amplitude, more especially as the plow is moving in one direction and raising or lowering sequentially or continuously with respect to the line "S" defined by the laser beam.

The structures of the various electronic panels or instruments used in the above described electronic circuit, are known.

As receivers, use can be made, for example, of the receivers manufactured by the firm Laserplane corp of Dayton, Ohio and sold under the reference index "Standard tracking D-115". This kind of receiver is a photoelectric device with a electronic circuit which may transfer the relative location of the detected laser beam to a control panel. The receiver also incorporates a directional motor which may be adjusted so as to automatically position the receiver to face the emitter as the plow moves.

As masts, use can be made of the masts also manufactured by the firm Laserplane and sold under the reference index "D-225 A-SN-36-1 or 2". This kind of mast incorporates an electric motor which drives a telescoping receiver mast and contains an electric interlock to move only in increments of 0.01 feet where grade is to be monitored.

As control panels, use can be made of the control panels manufactured by the firm Laserplane and sold under the reference index "Standard C-156-1 or -2". This kind of panel is a decision making electronic device which allows for both automatic control of the equipment or operator's monitoring.

As grade breaker panel, use can be made of the panel manufactured by the firm Laserplane and sold under the reference index "C-225". This kind of panel performs two basic functions that are the emission of a mast raise or lower signal to cause the system to establish a grade different from that of the plane or the light, and the measurement of the distance traveled.

Lastly, as electronic odometer, use can be made of the Grade Breaker Transmitter also manufactured and sold under the reference index "C-230" by the firm Laserplane.

The hydraulic operating circuit of the operating means 89 which incorporates the electric valves 107 and 117 actuated by the above described electronic circuit, is illustrated on FIG. 7.

This hydraulic circuit is in fact, the combination of two split-circuits both fed with pressure fluid from a common tank 131.

The first split-circuit comprises a pump 133 operated by the motor of the tractor, a pressure gauge 135 at the outlet of the pump 133 and a selector 137 for returning the fluid to the tank 131 or feeding it to a flow control valve 139 with a relief valve incorporated therein. The flow control valve 139 in turn feeds two manually controllable cylinders 141 which are used for adjusting and if necessary, correcting the longitudinal alignment of the plow (swing correction). The flow control valve 139 also fees the first electric valve 107 operable either manually from the first control panel 103 or automatically from the first receiver 85 via the first control panel 103.

As aforesaid, the first electric valve 107 operates the first cylinder 65 to raise or lower the plow. The pressure fluid then passes through a Y-fitting 140 into a damper 143 from which it returns to the tank 131 via a cooler 145 and a filter 147.

The second split-circuit also comprises a pump 149 completely distinct from the pump 133 which it is also operated by the motor of the tractor, and a high pressure relieve valve 151 with a pressure gauge 153, for feeding the fluid to the second electric valve 177 operable either manually from the second control panel 113 or automatically from the second receiver 87 via the second control panel 113, or for feeding it directly to a third electric valve 159 via a low pressure relief valve 157.

The second electric valve 117 operates the second cylinder 71 to tilt the plow in one or the other direction.

In operation, the second cylinder 71 is permanently fed with pressure fluid by the plow control valve 139 because it must compensate the effort to be exerted by the plow when the latter moves forwards in the ground. Accordingly, the outlets of the second electric valve 117 are connected to the second cylinder 71 so as to only correct the permanent effort exerted by the plow.

The pressure fluid from the second electric valve 117 then passes through the low pressure relief valve 157 into the third electric valve 159 which is directly controlled by the motor of the plow so as to feed a power feeder 161 as the plow moves forwards, or directly back to the filter 147 and tank 131, via a gauge 155.

The above mentioned power feeder 161 which is automatically controlled by the third electric valve 159 is a conventional accessory of the plow, which serves to push the drain tile out of the bottom of the plow when the latter is moving forwards.

We claim:

1. An improved guidance device for use with an earthworking machine with an earthworking element mounted on the machine about a pivot connection, comprising:
    a signal emitter to be located at a given reference point;
    two signal receivers mounted on the earthworking element, said two signal receivers being mounted on the element in a longitudinally spaced-apart relation for distinguishing between a depth change or an attitude change in the element; and
    operating means for adjusting the attitude or depth of the earthworking element depending on the indication given by the signal receiver.

2. An improved guidance device according to claim 1, wherein the operating means comprises first means for adjusting the attitude of the earthworking element and second means for adjusting the depth of the earthworking element, said first adjusting means being connected to one signal receiver while said second adjusting means being connected to the other signal receiver.

3. An improved guidance device according to claim 2, wherein the signal emitter consists in a rotatable laser beam generator.

4. In a drain tile laying machine of the type comprising a plow mounted about a pivot connection for digging a trench at a desired slope and laying a drain tile in the trench, a tractor for pulling the plow, means for controlling the attitude of the plow and means for controlling the depth of the plow, the improvement consisting in an improved guidance device comprising:
    a signal emitter to be located at the reference point in the field to be dug;
    two signal receivers mounted on the plow in a longitudinally spaced-apart relation for distinguishing between a depth change and an attitude change in the plow; and
    operating means connected to the signal receivers, for adjusting the attitude or depth of the plow or both of them depending on the indication given by the signal receiver, so as to move the plow back to its desired attitude and depth if it deviates therefrom.

5. A drain tile laying machine according to claim 4, wherein the attitude adjusting means are connected to one receiver and the depth adjusting means are connected to the other receiver, independently from each other.

6. A drain tile laying machine according to claim 5, wherein the emitter is located in the field to be dug at a given reference point higher than the highest point of the field to be dug and adjusted to emit therefrom a signal beam at an angle matching the desired slope, and the receivers are located at the top of two telescopic mast which are both set so that both receivers receive the signal from the emitter in their middles, both masts being simultaneously adjustable in height to compensate any irregularities in the field with respect to the line defined by the signal beam as the machine moves in the field.

7. A drain tile laying machine according to claim 6, wherein the signal emitter consists in a rotatable laser beam generator.

8. A drain tile laying machine according to claim 7, wherein the operating means includes an electronic control circuit comprising a first control panel connected to the attitude adjusting means and its associated signal receiver and mast; a second control panel connected to the depth adjusting means and its associated receiver and mast; and a common grade breaker panel connected to the first and second control panels for operating simultaneously both masts and receivers as the plow moves foward in the field to be dug.

* * * * *